United States Patent [19]

Tomiyama et al.

[11] Patent Number: 5,262,242
[45] Date of Patent: Nov. 16, 1993

[54] COLORED FILMS FOR USE IN VACUUM FORMING

[75] Inventors: Takeshi Tomiyama; Sadaaki Hashimoto; Naozumi Iwasawa; Kazuhisa Koizumi, all of Hiratsuka, Japan

[73] Assignee: Kansai Paint Co., Ltd., Amagasaki, Japan

[21] Appl. No.: 745,527

[22] Filed: Aug. 15, 1991

Related U.S. Application Data

[62] Division of Ser. No. 648,640, Jan. 31, 1991.

[30] Foreign Application Priority Data

Jan. 31, 1990 [JP] Japan .................................. 2-21371

[51] Int. Cl.$^5$ ....................... B32B 27/20; B32B 27/24; B32B 27/40
[52] U.S. Cl. .................................. 428/423.1; 428/40; 428/423.3; 428/423.7; 428/424.2; 428/425.1; 428/500; 524/507; 525/540; 525/129; 528/66; 528/77
[58] Field of Search ..................... 524/507; 528/66, 77; 428/40, 423.1, 425.1, 500; 525/540

[56] References Cited

U.S. PATENT DOCUMENTS

| | | | |
|---|---|---|---|
| 1,781,834 | 5/1920 | D'Autremont | 101/128.21 |
| 2,162,332 | 6/1939 | Frick | 41/39 |
| 2,576,491 | 11/1951 | Ulano | 101/128.2 |
| 2,620,516 | 6/1952 | Muller | 18/58 |
| 2,684,918 | 7/1954 | Oughton | 117/3.3 |
| 2,742,443 | 4/1956 | Diggles | 260/17 |
| 2,761,791 | 9/1956 | Russell | 117/34 |
| 2,884,340 | 4/1959 | Loshaek | 117/76 |
| 2,895,950 | 7/1959 | Krieble | 260/89.5 |
| 3,036,930 | 5/1962 | Grimminger et al. | 117/93 |
| 3,041,322 | 7/1962 | Krieble | 260/89.5 |
| 3,043,820 | 7/1962 | Krieble | 260/89.5 |
| 3,046,262 | 7/1962 | Krieble | 260/89.5 |
| 3,065,120 | 11/1962 | Avelar | 154/46.8 |
| 3,136,732 | 6/1964 | Kaestner et al. | 260/33.6 |
| 3,137,671 | 6/1964 | Bossard et al. | 260/17 |
| 3,149,995 | 9/1964 | Bauer | 117/66 |
| 3,203,941 | 8/1965 | Krieble | 260/89.5 |
| 3,218,305 | 11/1965 | Krieble | 260/89.5 |
| 3,227,605 | 1/1966 | Wolinski | 161/247 |
| 3,239,477 | 3/1966 | Karo | 260/23.5 |
| 3,260,637 | 7/1966 | von Bramer | 156/314 |
| 3,272,098 | 9/1966 | Buchholtz et al. | 94/7 |

(List continued on next page.)

FOREIGN PATENT DOCUMENTS

| | | |
|---|---|---|
| 714122 | 7/1965 | Canada . |
| 230364 | 7/1987 | European Pat. Off. . |
| 251546 | 1/1988 | European Pat. Off. . |
| 285071 | 5/1988 | European Pat. Off. . |
| 63-175670 | 7/1988 | Japan . |
| WO79/00103 | 3/1979 | PCT Int'l Appl. . |
| 886967 | 1/1962 | United Kingdom . |
| 1202330 | 8/1970 | United Kingdom . |
| 2040293 | 8/1980 | United Kingdom . |
| 2084513 | 4/1982 | United Kingdom . |
| WO89/04257 | 5/1989 | World Int. Prop. O. . |

Primary Examiner—Paul R. Michl
Assistant Examiner—Andrew E. C. Merriam
Attorney, Agent, or Firm—Fisher, Christen & Sabol

[57] ABSTRACT

A colored coating composition containing, as essential components, (I) a resin composition comprising at least one selected from a group consisting of a mixture of a polyol resin having a mean molecular weight of 1000 to 30,000 and hydroxyl group on backbone chain terminals with a polyisocyanate compound as a crosslinking agent and having a mean molecular weight of 400 or more, a mixture of acrylic resin with a vinyl chloride/vinyl acetate copolymer resin, and polyurethane resin;

(II) a coloring material, and (III) an organic solvent; and a colored film comprising a colored coating layer formed by use of the colored coating composition and suitable for use in vacuum forming.

7 Claims, 3 Drawing Sheets

U.S. PATENT DOCUMENTS

| | | | |
|---|---|---|---|
| 3,300,547 | 1/1967 | Gorman et al. | 260/885 |
| 3,316,189 | 4/1967 | Adams | 260/13 |
| 3,332,816 | 7/1967 | Kalinowski | 156/307 |
| 3,390,119 | 6/1968 | Alexander et al. | 260/33.6 |
| 3,401,143 | 1/1968 | Finelli et al. | 524/507 |
| 3,450,653 | 6/1969 | McClellan | 260/18 |
| 3,497,411 | 2/1970 | Chebiniak | 156/234 |
| 3,549,404 | 12/1970 | Liberti et al. | 117/26 |
| 3,549,472 | 12/1970 | King et al. | 161/87 |
| 3,551,232 | 12/1970 | Thompson | 156/87 |
| 3,650,880 | 3/1972 | Tieniber | 161/89 |
| 3,664,979 | 5/1972 | Tanomura et al. | 260/75 |
| 3,757,828 | 9/1973 | Frauenglass et al. | 525/129 |
| 3,794,548 | 12/1971 | Wirth et al. | 161/89 |
| 3,804,810 | 4/1974 | Fryd | 524/507 |
| 3,846,364 | 11/1974 | Criddle et al. | 260/33.6 |
| 3,871,938 | 3/1975 | Takahasi et al. | 156/246 |
| 3,892,900 | 7/1975 | Shima | 428/40 |
| 3,904,575 | 9/1975 | Satokawa et al. | 260/32.8 |
| 3,916,046 | 10/1975 | Youngberg | 427/207 |
| 3,935,353 | 1/1976 | Doerfling et al | 428/99 |
| 3,954,899 | 5/1976 | Chang et al. | 260/849 |
| 3,959,201 | 2/1976 | Chang | 260/29.4 |
| 3,984,607 | 10/1976 | Thoma et al. | 525/129 |
| 4,098,935 | 7/1978 | Knudsen | 428/40 |
| 4,115,619 | 9/1978 | Kurfman et al. | 428/336 |
| 4,125,653 | 11/1978 | Muzik | 428/40 |
| 4,147,679 | 4/1979 | Scriven et al. | 260/29.2 |
| 4,211,809 | 7/1980 | Barta | 428/201 |
| 4,423,179 | 12/1983 | Guagliardo | 524/539 |
| 4,485,228 | 11/1984 | Chang et al. | 528/84 |
| 4,496,628 | 1/1985 | Deatcher et al. | 428/337 |
| 4,550,052 | 10/1985 | Malek | 428/323 |
| 4,582,876 | 4/1986 | Weemes et al. | 525/64 |
| 4,678,690 | 7/1987 | Palmer et al. | 428/31 |
| 4,719,132 | 1/1988 | Porter, Jr. | 427/409 |
| 4,769,413 | 9/1988 | Fleming et al. | 524/507 |
| 4,810,540 | 3/1989 | Ellison et al. | 428/31 |
| 4,857,372 | 8/1989 | Ginkel et al. | 428/42 |
| 5,030,514 | 7/1991 | Hartman | 428/423.1 |
| 5,079,058 | 1/1992 | Tomiyama | 428/40 |

△ BASE FILM A
▲ BASE FILM B
○ CLEAR LAYER IN EXAMPLE I
● CLEAR LAYER IN COMPARATIVE EXAMPLE I

COLORED FILMS FOR USE IN VACUUM FORMING

This is a divisional of application Ser. No. 648,640, filed on Jan. 31, 1991, of Takeshi TOMIYAMA et al., for COLORED COATING COMPOSITION AND COLORED FILMS THEREFROM.

BACKGROUND OF THE INVENTION (1) Field of the Invention

The present invention relates to a colored coating composition and colored films which are obtained by using the composition in vacuum forming.

(2) Description of the Prior Art

In recent years, a method of applying a colored film by vacuum forming onto a member such as automobile parts in place of a method of coating a colored coating composition directly onto the member is being used because the former method has such advantages over the latter because the former method makes it possible to form a colored layer which has a uniform film thickness even on members with complicated shapes, and also makes it possible to easily carry out the printing of patterns, etc.

The above vacuum forming may be carried out, for example, as shown in FIGS. 1 and 2, by a process which comprises placing a colored film (2) for use in vacuum forming onto an upper face of a vacuum forming apparatus (6) provided with a heater (1) and a rest (4), followed by heating the colored film (2) at temperatures usually in the range of 100° C. to 150° C. by use of the heater (1) to be softened, and sucking a gas within the vacuum forming apparatus so that the colored film (2) may be adhered onto the surface of a member (3) to cover it.

The has been used in the art a colored film which was obtained by forming an adhesive layer on one side of a base film such as polyurethane film, polyester film or the like and by forming an acrylic polyol/polyisocyanate based metallic coating film layer on the other side of the base film.

However, the above colored film has disadvantages such as the heating of the base film at such temperatures as to make possible the vacuum forming reduces the elongation of the metallic coating film which results in causing coating film defects such as crazing, cracking and peeling on the metallic coating film after the vacuum forming.

Furthermore, it is necessary for the metallic layer as the colored layer and a clear layer to cover the metallic layer to have about double the film thickness of the normal coating film in order to obtain a satisfactory elongation of the metallic coating film after fabrication. The application of the spray coating process for increasing the film thickness of the metallic layer and the clear layer as above mentioned uses a large amount of thinner which results in such disadvantages as that the base film is impregnated with thinner and foaming takes place within the base film, the colored layer, the clear layer and the like during the vacuum forming.

SUMMARY OF THE INVENTION

It is an object of the present invention to provide a colored coating composition to be used for preparing a colored film which is capable of forming a vacuum forming product which has good appearance and is free of defects such as crazing, cracking, peeling and breaking on the coating film after the vacuum forming without a reduction in the elongation of the coating film even when the colored film is heated at vacuum forming temperatures.

It is another object of the present invention to provide a colored coating composition which has good adhesibility with the base so that the colored film obtained therefrom may not be peeled off during vacuum forming and will provide long term durability of the vacuum forming product.

It is still another object of the present invention to provide a colored film which is capable of obtaining a vacuum forming product which has a good appearance and is free of defects such as crazing, cracking, peeling and breaking on the coating film after vacuum forming without a reduction in the elongation of the coating film even when the colored film is heated at vacuum forming temperatures.

It is still another object of the present invention to provide a colored film which is not peeled off during vacuum forming and will provide long term durability.

It is still another object of the present invention to provide a colored film which is capable of obtaining a vacuum forming product which has a good appearance and is free of defects such as crazing, cracking, peeling and breaking of the coating film after vacuum forming, and is free from foaming therein during vacuum forming.

First, the present invention provides a colored coating composition, which contains, as essential components, (I) a resin composition which comprises at least one selected from a group which consists of a mixture of a polyol resin which has a mean molecular weight of 1000 to 30,000 and a hydroxyl group on a backbone chain terminals with a polyisocyanate compound as a crosslinking agent and which has a mean molecular weight of 400 or more (hereinafter referred to as a mixture (A)), a mixture of an acrylic resin with a vinyl chloride/vinyl acetate copolymer resin (hereinafter referred to as a mixture (B)), and a polyurethane resin; (II) a coloring material, and (III) an organic solvent.

Secondly, the present invention provides a colored film which is prepared by successively laminating an adhesive layer, preferably a base film, a colored coating layer, and preferably a clear layer; the colored coating layer is formed by use of the above colored coating composition.

Thirdly, the present invention provides a colored film which is formed by successively laminating a releasable sheet, an adhesive layer, a base film layer, the colored coating layer, preferably a hot melt adhesive layer and a clear layer which comprises a clear film layer separately prepared; the colored film is formed by a process which comprises successively laminating the releasable sheet, the adhesive layer, the base film layer and the colored coating layer to form a colored base film layer; and separately and successively laminating, preferably the hot melt adhesive layer, the clear film layer and a process paper sheet to form a clear layer laminate, followed by laminating the clear layer laminate onto the colored base film layer so that the surface of the colored coating layer may be brought into contact with the surface of the clear film layer, preferably using the hot melt adhesive layer while heating according to a laminate process in order to form a colored film laminate, and by removing the process paper sheet.

Fourthly, the present invention provides a colored film which is formed by successively laminating a releasable sheet, an adhesive layer, a base film layer, the colored coating layer, a hot melt adhesive layer and a clear layer which comprises a clear film layer separately prepared; the colored film is formed by a process which comprises successively laminating the releasable sheet, the adhesive layer, the base film layer, the colored coating layer and a hot melt adhesive layer separately formed to form a colored base film layer, and separately and successively laminating the clear film layer and a process paper sheet to form a clear layer laminate, followed by laminating the clear layer laminate onto the colored base film layer so that the surface of the hot melt adhesive layer may be brought into contact with the surface of the clear film layer while heating according to a laminate process to form a colored film laminate, and by removing the process paper sheet.

DETAILED DESCRIPTION OF THE INVENTION

Figure 1:
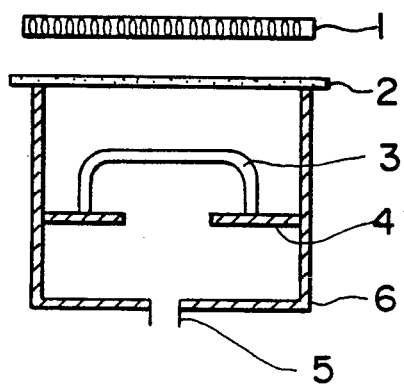
FIGS. 1 and 2 are explanatory cross sectional views which show an example of the application of the colored film of the present invention according to vacuum forming.

The mixture (A) in the resin composition (I) which constitutes the colored coating composition of the present invention is a mixture of polyol resin with a polyisocyanate compound.

The polyol resin is a resin which has two or more hydroxyl groups on an average in one molecule, and which has the hydroxyl group on a terminal of its molecular backbone chain, substantially free of a hydroxyl group on its molecular side chain, and which has a mean molecular weight of 1000 to 30,000, preferably 3000 to 30,000. Specific examples of the polyol resin may include polyester polyol, polyether polyol, polyurethane polyol, polysiloaxane polyol, and the like. Preferable examples of the polyester polyol may include a condensation type polyester polyol between a polybasic acid such as (anhydrous) phthalic acid, terephthalic acid, dimethyl terephthalate, sebacic acid, azelaic acid or the like and a glycol such as ethylene glycol, polyethylene glycol, propylene glycol, neopentyl glycol, the following polyether polyol or the like, a lactone type polyester polyol obtained by ring opening polymerization of ε-caprolactam, and the like. Preferred examples of polyether polyol may include polymeric type polyether polyol between glycol such as ethylene glycol, propylene glycol or the like and alkylene oxide such as ethylene oxide, propylene oxide or the like, polytetramethylene ether glycol obtained by cationic polymerization of tetrahydrofuran, and the like. Preferred examples of poly urethane polyol may include those obtained by incorporating for being reacted diisocyanate such as hexamethylene diisocyanate, isophorone diisocyanate, (hydrogenated) xylylene diisocyanate, (hydrogenated) tolylene diisocyanate, (hydrogenated) diphenylmethane diisocyanate or the like in such an amount as to contain two or more hydroxyl groups on an average on the terminal of its molecular backbone chain into a polyol component such as the above polyester polyol, polyether polyol, glycol or the like as a starting material. Preferred examples of polysiloxane polyol may include those represented by the general formula:

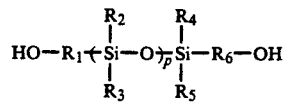

where $R_1$ and $R_6$ are the same or different and represent $C_{1-8}$ alkylene group or $(R'-O-R'')_q$ group, $R_2$, $R_3$, $R_4$ and $R_5$ are the same or different and represent a monovalent hydrocarbon group, p is an integer of 0 to 20, $R'$ and $R''$ are the same or different and represent $C_{1-8}$ alkylene group, q represents an integer of 1-10, examples of the alkylene group being $-CH_2-$, $-C_2H_4-$, $-C_3H_6-$, $-C_4H_8-$, $-C_6H_{12}$, $-C_8H_{16}-$ and the like, examples of the hydrocarbon group being $C_{1-8}$ alkyl group, $C_{5-8}$ cycloalkyl group, aryl group, aralkyl group and the like.

The polyisocyanate compound used in combination with the above polyol resin has two or more on an average of the isocyanate groups in one molecule and a mean molecular weight of 400 or more. Preferred examples of the polyisocyanate compound may include modified diisocyanate compounds obtained by incorporating for being reacted the above diisocyanate in such an amount as to contain two on an average two of the isocyante groups on the molecular terminal into the polyol component such as the above polyester polyol, the above polyether polyol, the above polyester polyol, the above polyether polyol, the above polyurethane polyol, the above polysiloxane polyol, glycol or the like as a starting material. Other examples of the polyisocyanate compound may include adducts of the above diisocyanate with polyol such as glycerine trimethylol propane, pentaerythritol or the like, those containing three or more of the isocyanate groups in one molecule, for example, trimers of the above diisocyanate, and the like. Of these, the modified diisocyanate compound is preferred, particularly one having a mean molecular weight of 1000 to 30,000.

The polyol resin and the polyisocyanate compound are used respectively in such amounts that a ratio of the hydroxyl group to the isocyanate group is usually in the range of about 0.8 to 1.2.

The mixture (B) which constitutes the resin composition (I) of the present invention is a mixture of acrylic resin with vinyl chloride/vinyl acetate copolymer resin. The acrylic resin may include thermoplastic acrylic resin conventionally used in an acrylic resin coating composition, i.e., acrylic lacquer. Preferred examples of the acrylic resin may include acrylic polymer which comprise (meth) acrylic ester as the major monomer component, for example, Paraloid A-11, Paraloid A-10, Paraloid A-21, Paraloid A-101, Paraloid B-50, Paraloid B-67MT, Paraloid C-10LV, Paraloid F-10 and Paraloid NAD-10 (trademarks, marketed by Rohm & Haas Co.). Preferred examples of the vinyl chloride/vinyl acetate copolymer resin may include copolymers which comprise vinyl chloride as a major component, for example, Vinylite VYNS, Vinylite VYHH, Vinylite VYHD, Vinylite WYLF, Vinylite VYNW, Vinylite VAGH, Vinylite VAGD, Vinylite VMCH and Vinylite VMCC (trademarks, marketed by Union Carbide Corp.).

The acrylic resin and the vinyl chloride/vinyl acetate copolymer resin are used preferably in such amounts that the former is in the range of about 50 to 80 percent by weight and the latter is in the range of about 50 to 20 percent by weight relative to the total amount of both components respectively. When the amount of the former is less that about 50 percent by weight or that of the latter is more than about 50 percent by weight, weathering resistance, resistance to gasoline, wear resistance, etc. therefrom may undesirably become poor. On the other hand, when the amount of the former is more than about 80 percent by weight or that of the latter is less than about 20 percent by weight, mechanical properties, etc. therefrom may undesirably become poor.

The polyurethane resin as the resin composition (I) in the present invention may include a lacquer type resin which has two or more on an average urethane bonds in one molecule and has a molecular weight of about 2000 to 30,000. Preferred examples thereof may include reaction products of the above polyol resin with a polyisocyanate component such as the above diisocyanate, an oligomer of diisocyanate, and adduct between diisocyanate and polyol, or the like. These reaction products may be represented by the general formula:

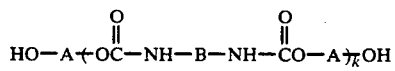

where A is bivalent $C_{2-12}$ hydrocarbon group, straight-chain polyester bond derived from straight-chain polyester resin with hydroxyl group on both terminals and having a molecular weight of about 100 to 30,000, straight-chain polyether bond derived from straight-chain polyether resin with hydroxyl group on both terminals or straight-chain polysiloxane bond derived from straight-chain polysiloxane resin with hydroxyl group on both terminals, B is a bivalent hydrocarbon group derived from polyisocyanate with isocyanate group on both terminals, and k is an integer of 10 to 100.

Examples of the bivalent hydrocarbon group may include a branched-chain or straight-chain alkylene group, substituted or unsubstituted phenylene group; and the like.

The coloring material used in the colored coating composition may include color pigments, dyes, fluorescent dyes, fluorescent pigments and the like. The above pigments and dyes may be arbitrarily selected for use from conventionally used ones. Of these the pigment is preferably used from the standpoint of light-resistance. Examples of the color pigment may include inorganic pigments such as carbon black and titanium oxide; organic pigments, for example, quinacridone pigments such as quinacridone red pigment, azo-pigments such as pigment red, phthalocyanine pigments such as phthalocyanine blue and phthalocyanine green; flake metallic powders such as aluminum powder, copper powder, mica flake-like iron oxide powder, bronze powder, stainless steel powder and the like; and the like. The amount of the color pigment or dye to be used may vary depending on its own properties such as opacifying power, specific gravity and the like, but may be in the range of normally 0.5 to 300 parts by weight, preferably 3 to 150 parts by weight per 100 parts by weight of the resin solid content. In addition thereto, loading pigments such as barium sulfate, calcium carbonate, clay, zinc white, silica and the like may be used in combination therewith.

The organic solvent (III) used in the colored coating composition may include an inactive organic solvent which is capable of dissolving or dispersing the above mixture (A) and mixture (B) and which does not react with a functional group such as an isocyanate group and hydroxyl group when the above mixtures (A) and (B) contain the functional group, and which is preferably an organic solvent having a boiling point of 220° C. or lower. Preferred examples of the inactive organic solvent used may include aliphatic hydrocarbons such as pentane, hexane, heptane and the like, aromatic hydrocarbons such as toluene, xylene and the like, ethers such as ethylene glycol diethyl ether and the like, ketones such as methyl ethyl ketone, methyl isobutyl ketone, acetone and the like, and esters such as ethyl acetate, butyl acetate and the like. When the above mixture (B) and polyurethane resin are used, in addition to the above examples of the organic solvent (III), alcohols such as isopropyl alcohol, butyl alcohol, Cellosolve, diethylene glycol monoethyl ether and the like may also be used.

Respective embodiments of the colored film which comprise a colored coating layer formed by use of the above colored coating composition of the present invention are shown in FIGS. 3 through 7.

Figure 3:
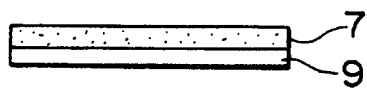
FIGS. 3 through 7 are explanatory cross sectional views of respective embodiments of the colored film of the present invention.

A first embodiment of the colored film is one formed by laminating the colored coating layer 7 onto an adhesive layer 9 as shown in FIG. 3.

Figure 4:
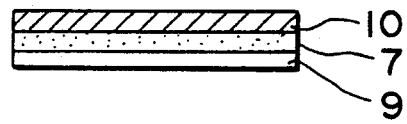

A second embodiment of the colored film is one formed by successively laminating the adhesive layer 9, the colored coating layer 7 and a clear layer 10 as shown in FIG. 4.

Figure 5:
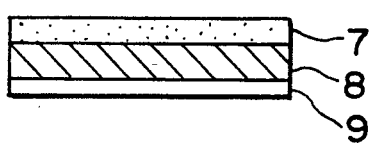

A third embodiment of the colored film is one formed by successively laminating the adhesive layer, a base film layer 8 and the colored coating layer 7 as shown in FIG. 5.

Figure 6:
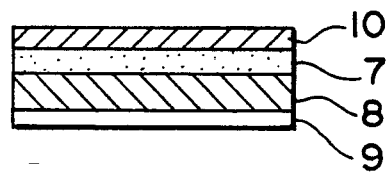

A fourth embodiment of the colored film is one formed by successively laminating the adhesive layer 9, the base film layer 8, the colored coating layer 7 and the clear layer 10 as shown in FIG. 6.

Figure 7:
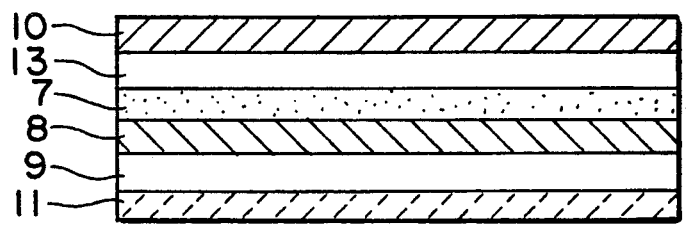

A fifth embodiment of the colored film is one formed by successively laminating a releasable sheet 11, the adhesive layer 9, the base film layer 8, the colored coating layer 7, preferably a hot melt adhesive layer 13 and clear film layer 10 as shown in FIG. 7.

The adhesive layer 9 is used in order to adhere the base film layer 8 or the colored coating layer 7 to the member 3 so that the colored film may not be easily peeled off. The adhesive constituting the adhesive layer 9 may include heat sensitive or pressure-sensitive adhesives, for example, adhesives which comprise resins such as ethylene-vinyl acetate resin, acrylic resin, vinyl resin, rubber and the like, as a major component. The adhesive layer has a film thickness of normal 20 to 100 $\mu$m.

A releasable sheet 11 may preferably be laminated onto the adhesive layer 9. The releasable sheet 11 may be prepared by treating a sheet which comprises paper, plastics or the like with a release agent such as silicone, wax and the like. The releasable sheet 11 is removed on applying the colored film to the above member 3.

The base film layer 8 may include conventionally used thermoplastic plastic films, so long as they are softened by heating and do not produce problems such as crazing, cracking, breaking and the like during vacuum forming. Specific examples of the base film layer 8 may include ones which respectively comprise polyvinyl chloride resin, ABS resin, polyester resin, polyurethane resin and the like. The base film layer 8 has a film thickness of normally about 0.1 to 0.5 mm.

The colored coating layer 7 may be formed by coating or printing the above colored coating composition on the surface of the adhesive layer 9 or the base film layer 8 according to a coating method such as roll coating, spraying, knife coating, curtain flow coating and the like, or a printing method such as silk screen printing, gravure printing and the like to a dry film thickness of about 30 to 100 μm, followed by drying.

The clear layer 10 may preferably be formed on the surface of a metallic coating layer formed from a colored coating composition which contains metallic powder as the pigment. The clear layer 10 may be formed by use of a clear coating composition which comprises the resin composition (I) and the organic solvent (III) used in the colored coating composition. The clear layer may be formed by coating in the same coating method as in the colored coating composition to a dry film thickness of about 40 to 200 μm, preferably about 50 to 100 μm, followed by drying.

Figure 8:
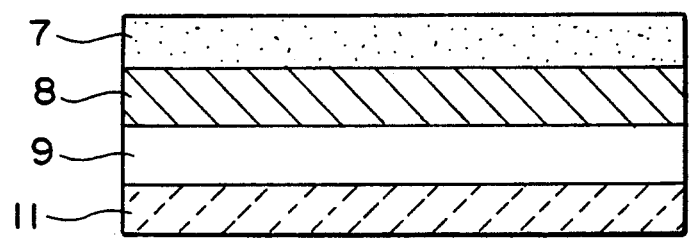
FIG. 8 is an explanatory cross sectional view of a colored base film used for forming the colored film shown in FIG. 7.
Figure 9:
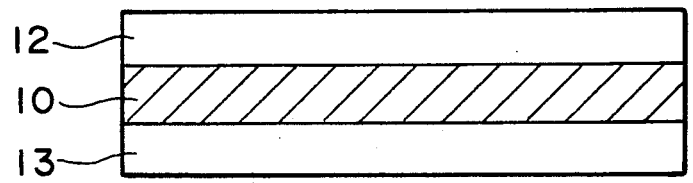
FIG. 9 is an explanatory cross sectional view which explains the formation of the clear layer in the colored film shown in FIG. 7.
Figure 10:
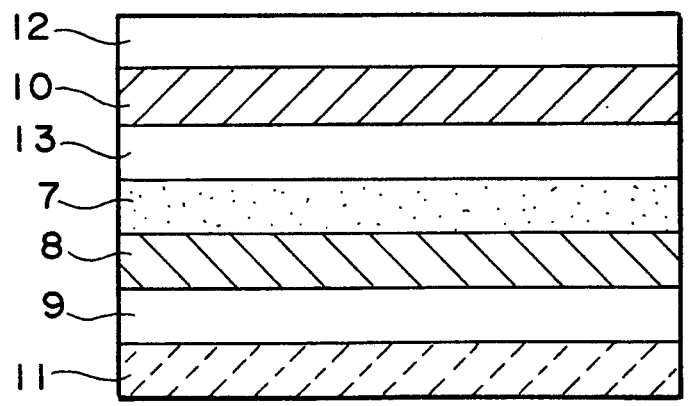
FIG. 10 is a graph which shows a relationship between temperature and elongation for an individual film.

The colored film of the fifth embodiment is preferably formed by a process which comprises successively laminating the releasable sheet 11, the adhesive layer 9, the base film layer 8 and colored coating layer 7 to form a colored base film layer as shown in FIG. 8, and separately and successively laminating, preferably the hot melt adhesive layer 13, the clear film layer 10 and a process paper sheet 12 to form a clear layer laminate as shown in FIG. 9, followed by laminating the clear layer laminate onto the colored base film layer so that the surface of the colored coating layer 7 may be brought into contact with the surface of the hot melt adhesive layer 13 or clear film layer 10 while heating according to a laminate process to form a colored film laminate as shown in FIG. 10, and by removing the process paper sheet 12; or by a process which comprises successively laminating the releasable sheet 11, the adhesive layer 9, the base film layer 8, the colored coating layer 7 and a hot melt adhesive layer 13 separately formed to form a colored base film layer, and separately and successively laminating the clear film layer 10 and a process paper sheet 12 to form a clear layer laminate, followed by laminating the clear layer laminate onto the colored base film layer so that the surface of the hot melt adhesive layer 13 may be brought into contact with the surface of the clear film layer 10 while heating according to a laminate process to form a colored film laminate, and by removing the process paper sheet.

The colored base film layer may preferably be prepared by a process which comprises successively laminating the releasable sheet 11, the adhesive layer 9 and the base film layer 8 to form a laminated film, and coating or printing the above colored coating composition on the surface of the base film layer 8 according to a coating method such as roll coating, spraying knife coating, curtain flow coating and the like, or a printing method such as silk screen printing, gravure printing and the like to a dry film thickness of about 30 to 100 μm, preferably about 40 to 80 μm, followed by drying to form a colored coating layer. A hot melt adhesive layer may preferably be formed on the colored coating layer.

The colored base film layer may also be prepared by a process which comprises coating or printing the colored coating composition on one side of the base film layer 8, followed by drying to form the colored coating layer 7 on the base film layer 8, laminating the adhesive layer 9 on the other side of the base film layer 8, and by laminating the releasable sheet 11. Coating and printing may be carried out in the same manner as above mentioned. The dry film thickness of the colored coating layer may be the same as above mentioned.

Of the above coating or printing methods, the coating methods such as roll coating, knife coating and curtain flow coating or the like are preferred because vacuum forming products which are free of defects such as foaming are obtained.

Conditions for the above mentioned drying may vary depending on the kind of the resin composition and the kind or content of the organic solvent, but the drying may usually be carried out under such conditions as a range of room temperature to about 180° C. for about 10 minutes to about 2 days.

On forming the above clear layer laminate, the above clear coating composition which comprises the resin composition (I) and the organic solvent (III) may be coated on the surface of the process paper sheet 12 which comprises, for example, polyethylene terephthalate, followed by drying to form the clear film layer 10, and the hot melt adhesive layer 13 is formed on the surface of the clear film layer 10. The conditions for the above drying may be the same as those in the above colored coating composition. The dry film thickness of the clear layer 10 may be about 40 to 200 μm, preferably about 50 to 100 μm.

Formation of the hot melt adhesive layer 13 on one side of the clear film layer 10 or the colored coating layer 7 makes it possible to improve adhesibility between the colored coating layer 7 and the clear film layer 10. The film thickness of the hot melt adhesive layer 13 is preferably in the range of about 2 to 10 μm.

The hot melt adhesive used in the above hot melt adhesive layer 13 may arbitrarily be selected from conventionally used ones which melt by heating and show adhesibility. Of these, thermoplastic hot melt adhesives are preferred. Examples of trademarks, under which the hot melt adhesive is marked, may include Denka Vinyl 1000 (marketed by Asahi Denka Kogyo K.K.), Nymelt (marketed by Nitto Kasei Chemical Industries Inc.), NUC-EVA (marketed by Nippon Unicar Co., Ltd.), Alonmelt PES (marketed by Toagosei Chemical Industry Co., Ltd.), Tohmide (marketed by Fuji Kasei Kogyo Co., Ltd.), Bylon (marketed by Toyobo Co., Ltd.) and the like. The film thickness of the hot melt adhesive layer 13 is usually in the range of about 0.5 to 10 μm, preferably about 2 to 10 μm, more preferably about 2 to 5 μm.

The above laminate processing may be carried out by the use of a heating twin roll at temperatures in the range of about 40° to 160° C.

The vacuum forming process of applying the colored film of the present invention to a member may include conventionally used ones, and specifically may include one described with reference to FIGS. 1 and 2 above. The member may include ones made of various materials. Specific examples of various materials which constitute the member may include plastics such as polyurethane, polyamide, reinforced plastic, phenol resin, polyvinyl chloride, polyethylene and the like, woods, metals, and the like.

First, the present invention makes it possible to provide a colored coating composition to be used for preparing a colored film which is capable of forming a vacuum forming product which has a good appearance and is free of defects such as crazing, cracking, peeling and breaking on the coating film after vacuum forming without a reduction in the elongation of the coating film even when the colored film is heated at vacuum forming temperatures.

Secondly, the present invention makes it possible to provide a colored coating composition which has good adhesibility with the base so that the colored film obtained therefrom may not be peeled off during vacuum forming and will provide long term durability of the vacuum forming product.

Thirdly, the present invention makes it possible to provide a colored film which is capable of obtaining a vacuum forming product which has a good appearance and is free of defects such as crazing, cracking, peeling and breaking on the coating film after vacuum forming without a reduction in the elongation of the coating film even when the colored film is heated at vacuum forming temperatures.

Fourthly, the present invention makes it possible to provide a colored film which is not peeled off during vacuum forming and will provide long term durability.

Fifthly, the present invention makes it possible to provide a colored film which is capable of obtaining a vacuum forming product which has a good appearance and is free of defects such as crazing, cracking, peeling and breaking on the coating film after vacuum forming, and foaming therein during vacuum forming.

EXAMPLE

The present invention will be explained more in detail by the following Examples, in which "part" and "%" are all by weight.

PREPARATION OF RESIN COMPOSITION (I) SOLUTION

PREPARATION EXAMPLE 1

Preparation of resin composition solution ①

A resin mixture of 28.16 parts of Paraloid Al-11 and 7.04 parts of Vinylite VYNS was dissolved in a mixed organic solvent of 42.24 parts of methyl ethyl ketone, 5.63 parts of xylene and 22.53 parts of methyl isobutyl ketone to obtain a resin composition solution ①.

PREPARATION EXAMPLE 2

Preparation of resin composition solution ②

A mixture of 1000 parts of polytetramethylene glycol having a molecular weight of 200 and 80 parts of 1,6-hexane diisocyanate was reacted at 80° C. in 200 parts of N-methylpyrrolidone, followed by diluting with 880 parts of ethyl acetate to obtain a resin composition solution ② which comprises such polyether urethane lacquer as to have a solid content of 50%, a resin molecular weight of 45000 and a terminal hydroxyl group.

PREPARATION EXAMPLE 3

Preparation of resin composition solution ③

A mixture of 133 parts of terephthalic acid and 104 parts of neopentyl glycol was subjected to a dehydration condensation reaction at 130° C. to obtain a polyester having a molecular weight of 1000 and containing a terminal hydroxyl group. The resulting polyester was dissolved in 42 parts of N-methylpyrrolidone and 168 parts of ethyl acetate to obtain a resin composition solution ③ having a solid content of 50%.

PREPARATION EXAMPLE 4

Preparation of resin composition solution ④

A mixture of 2000 parts of the above resin composition solution ③ and 202 parts of 1,6-hexamethylene diisocyanate was reacted at 80° C. to obtain a polyester urethane having a molecular weight of 6000 and containing a terminal isocyanate group, followed by adding 202 parts of ethyl acetate to obtain a resin composition solution ④ having a solid content of 50%.

PREPARATION EXAMPLE 5

Preparation of resin composition solution ⑤

A mixture of 600 parts of the above resin composition solution ④ and 13.4 parts of trimethylolpropane was reacted at 70° C. to obtain a polyester urethane having a molecular weight of 6000 and two hydroxyl groups on an average on a molecular terminal, followed by dissolving in 13.5 parts of N-methylpyrrolidone to obtain a resin composition solution 5 having a solid content of 50%.

PREPARATION EXAMPLE 6

Preparation of resin composition solution ⑥

A mixture of 1000 parts of the above resin composition solution ③ and 76 parts of 1,6-hexamethylene diisocyanate was reacted at 80° C. to obtain a hydroxyl group-terminated polyester urethane having a molecular weight of 12,000, followed by dissolving in 76 parts of N-methylpyrrolidone to obtain a resin composition solution ⑥ having a solid content of 50%.

PREPARATION EXAMPLE 7

Preparation of resin composition solution ⑦

A mixture of 1152 parts of the above resin composition solution ⑥ and 10 parts of Takenate P-165N (trademark of aliphatic polyisocyanate marketed by Takeda Chemical Industries, Ltd.) was reacted to obtain a polyester urethane having a molecular weight of 12,000 and two hydroxyl groups on an average on respective molecular terminals, followed by dissolving in 10 parts of N-methylpyrrolidone to obtain a resin composition solution ⑦ having a solid content of 50%.

PREPARATION EXAMPLES 8-13

Preparation of metallic coating compositions (a), (b), (c), (d), (e) and (f)

Into respective resin composition solutions listed in Table 1 was incorporated Alpaste 52-402 (trademark of flake aluminum powder marketed by Toyo Aluminum Co., Ltd.) in an amount of 20 parts as a solid content per 100 parts of the resin solid content to obtain a metallic coating composition having a solid content of 54%.

PREPARATION EXAMPLES 14-19

Preparation of clear coating compositions (g), (h), (i), (j), (k) and (l)

To the resin composition solutions listed in Table 1 were added Tinuvin-900 (trademark of ultraviolet absorber marketed by Ciba Geigy A. G.) and LS-292 (trademark of photostabilizer marketed by Sankyo Co., Ltd.) in an amount of 0.5 part per 100 parts of the resin respectively to obtain clear coating compositions.

PREPARATION EXAMPLES 20-22

Preparation of white coating compositions (m), (n) and (o)

Into the resin composition solutions listed in Table 1 was incorporated Tipaque CR-93 (trademark of titanium white marketed by Ishihara Sangyo Kaisha, Ltd.) in an amount of 80 parts per 100 parts of the solid content of the resin to be dispersed, followed by diluting to a spraying viscosity with a diluent solvent to obtain white coating compositions.

TABLE 1

| | Metallic coating composition | | | | | | Clear coating composition | | | | | | White coating composition | | |
|---|---|---|---|---|---|---|---|---|---|---|---|---|---|---|---|
| | a | b | c | d | e | f | g | h | i | j | k | l | m | n | o |
| Resin composition solution | ① | ② | ③ | ④ | ⑤ | ⑥ | ① | ② | ③ | ④ | ⑤ | ⑥ | ① | ② | ③ |
| Curing agent | — | — | ④ | ③ | ④ | ⑦ | — | — | ④ | ③ | ④ | ⑦ | — | — | ④ |
| OH/NCO ratio | — | — | 1.0 | 1.0 | 1.0 | 1.0 | — | — | 1.0 | 1.0 | 1.0 | 1.0 | — | — | 1.0 |
| Pigment | Alpaste 52-402 | | | | | | None | | | | | | titanium white | | |
| Diluent solvent | | | | | | | xylol | | | | | | | | |

EXAMPLES 1-7

As shown in Table 2, an acrylic adhesive layer and a silicone-treated releasable sheet were successively laminated on one side of a base film having a film thickness of 200 μm and comprising polyvinyl chloride film (A) or an ABS resin film (B)(*4), and metallic coating compositions (a) to (f) were coated on the other side of the base film by spray coating to a dry film thickness of 40 μm, followed by drying, coating thereon clear coating compositions (g) to (1) by spray coating to a dry film thickness of 60 μm, and by drying to obtain a colored film formed by successively laminating a releasable sheet, an adhesive layer, a base film layer, a metallic coating layer and a clear layer.

Figure 2:
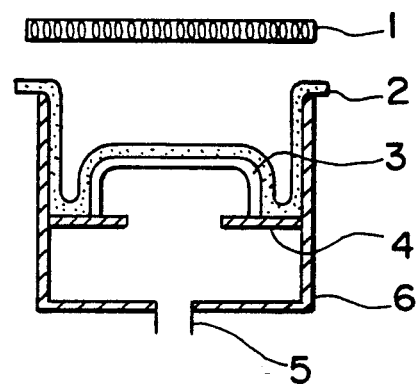

Next, the releasable sheet of the above colored film was released, and a resulting colored film was then applied onto an automobile member of a conical steel material having a depth of 7 cm and a diameter of 15 cm by use of the vacuum forming apparatus shown in FIGS. 1-2 under such a condition that the film surface temperature is 100° C. The above vacuum forming was carried out under such conditions that the resulting colored film showed an elongation of 200% in its maximum extended area and a reduction of 10% in its maximum reduced area. The elongation 0% means that no extension is observed, and the elongation 200% means doubly extended percentage.

EXAMPLES 8-10

As shown in Table 2, a base film was prepared in the same manner as in Example 7, and white coating compositions were coated on the other side of the base film by spray coating to a dry film thickness of 50 μm, followed by drying to obtain a colored film formed by successively laminating a releasable sheet, and adhesive layer, a base film and a white layer. The resulting colored film was subjected to vacuum forming in the same manner as in Example 1.

COMPARATIVE EXAMPLE 1

A colored film was prepared in the same manner as in Example 1 and was subjected to vacuum forming in the same manner as in Example 1 except that a metallic coating composition was prepared by formulating Retan PG80 Metallic Base (trademark of acrylic polyol marketed by Kansai Paint Co., Ltd.) and Retan PG (trademark of polyisocyanate marketed by Kansai Paint Co., Ltd.) curing agent in such amounts that the NCO-/OH ratio may be about 1.0, followed by diluting with a diluent solvent to a spraying viscosity (*1), and a clear coating composition was prepared by formulating Retan PG80 Quartz Clear Z (trademark of acrylic polyol marketed by Kansai Paint Co., Ltd.) and Retan PG (trademark of polyisocyanate marketed by Kansai Paint Co., Ltd.) curing agent in such amounts that the NCO/OH ratio may be about 1.0, followed by diluting with a diluent solvent to a spraying viscosity (*2). On vacuum forming, the colored film thus formed showed a little foaming.

TABLE 2

| | Examples | | | | | |
|---|---|---|---|---|---|---|
| | 1 | 2 | 3 | 4 | 5 | 6 |
| Base film (*4) | A | A | A | A | A | A |
| Metallic coating composition | a | b | c | d | e | f |
| Drying conditions | 40° C.-2H | 40° C.-2H | 40° C.-2H | 40° C.-2H | 40° C.-2H | 40° C.-2H |
| Clear coating composition | g | h | i | j | k | l |
| Drying conditions | 40° C.-2H | 40° C.-2H | 40° C.-2H | 40° C.-2H | 40° C.-2H | 40° C.-2H |
| White coating composition | | | | | | |
| Drying conditions | | | | | | |
| Vacuum forming temperature (°C.) | 100 | 100 | 100 | 100 | 100 | 100 |
| Film appearance after vacuum forming (*3) | good | good | good | good | good | good |

| | Examples | | | | Comparative Example |
|---|---|---|---|---|---|
| | 7 | 8 | 9 | 10 | 1 |
| Base film (*4) | B | B | B | B | A |
| Metallic coating composition | a | | | | (*1) |
| Drying conditions | 40° C.-2H | | | | 40° C.-2H |
| Clear coating composition | g | | | | (*2) |
| Drying conditions | 40° C.-2H | | | | 40° C.-2H |
| White coating composition | | m | n | o | |
| Drying conditions | | 80°-30' | 80°-30' | 80°-30' | |
| Vacuum forming temperature (°C.) | 130 | 130 | 130 | 130 | 100 |
| Film appearance after vacuum | good | good | good | good | Crazing in metallic |

TABLE 2-continued

| forming (*3) | film and clear film |

EXAMPLE 11

A metallic coating composition (a) was coated on the surface of a modified alkyd resin-treated releasable sheet by spray coating to a dry film thickness of 80 μm, followed by drying at 80° C. for 30 minutes, coating thereon a clear coating composition (g) by spray coating to a dry film thickness of 80 μm, and by drying at 80° C. for 30 minutes to obtain a laminate formed by successively laminating a releasable sheet, a metallic layer and a clear layer, releasing the releasable sheet from the metallic layer, and by coating an acrylic adhesive on the surface of the metallic coating layer to a film thickness of 40 μm to obtain a colored film formed by successively laminating an adhesive layer, a metallic coating layer and a clear layer. The resulting colored film was subjected to vacuum forming in the same manner as in Example 1 with the result that the colored film showed good appearance after vacuum forming.

(*3) Film appearance after vacuum forming in the Examples and Comparative Examples was evaluated by observing the presence of defects such as reduction in gloss, crazing, cracking, peeling and the like in the maximum extended area and the maximum reduced area as compared to that before vacuum forming.

TEST EXAMPLE 1

Figure 11:
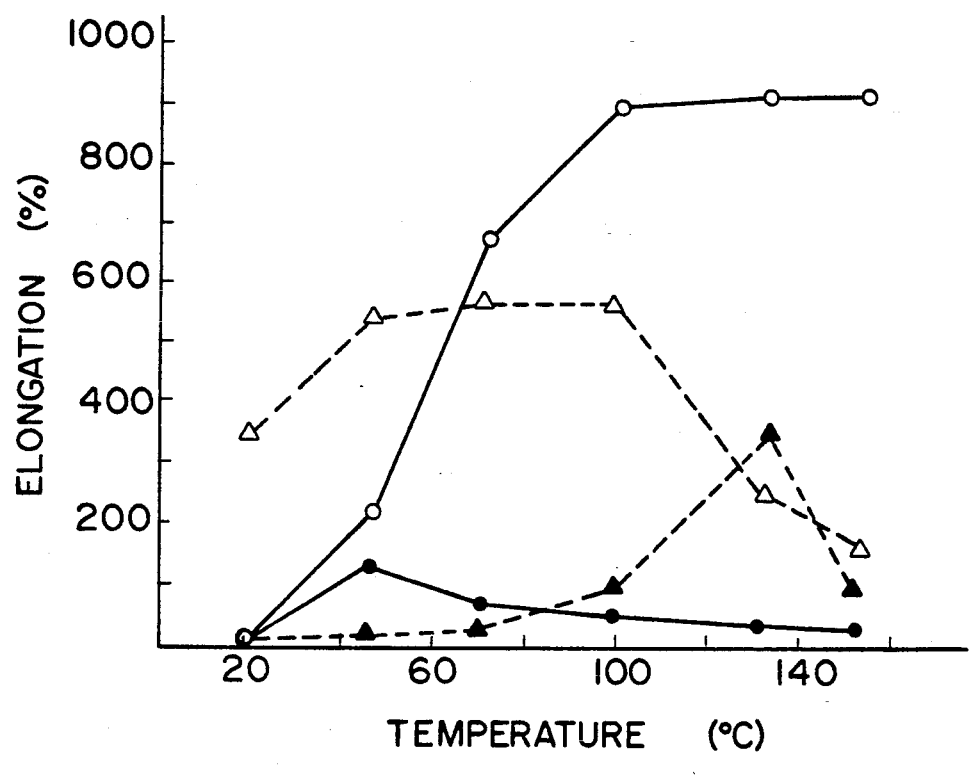

Relationships between temperature (°C.) and elongation (%) were determined individually for a 60 μm film of the clear coating composition used in Examples 1, a 60 μm cured film of the clear coating composition used in Comparative Example 1, the above base film (A) and the above base film (B) at a rate of pulling of 300 mm/min. by use of an autograph marketed by Shimadzu Seisakusho Ltd. The results are shown in FIG. 11. The results show that the base film (A) showed an elongation of 590% at a vacuum forming temperature of 100° C. and the base film (B) showed an elongation of 370% at a vacuum forming temperature of 130° C., whereas the above film used in Example 1 showed an elongation of 880% at vacuum forming temperatures of 100° C. and 130° C. respectively to show higher elongations than the base films (A) and (B) and to be improved in vacuum forming properties, and show that the clear film used in Comparative Example 1 showed lower elongations than those of the base films (A) and (B) and was poor in vacuum forming properties.

EXAMPLES 12-18

Preparation of colored film of the above fifth embodiment

An acrylic adhesive layer and a silicone-treated releasable sheet were successively laminated on one side of a base film having a film thickness of 250 μm and comprising polyvinyl chloride film (A) or an ABS resin film (B), and metallic coating compositions (a) to (f) were coated on the other side of the base film with a roll coater to a dry film thickness of 40 μm, followed by drying at 40° C. for 2 hours to obtain a colored base film formed by successively laminating a releasable sheet, an adhesive layer, a base film layer and a colored coating layer.

Separately, respective clear compositions (g) to (l) were coated on a process paper sheet comprising polyethylene terephthalate with a roll coater to a dry film thickness of 80 μm, followed by drying at 80° C. for 30 minutes to form a clear film layer, and Alonmelt PES (trademark of hot melt adhesive marketed by Toagosei Chemical Industry Co., Ltd.) was coated on the clear film layer formed as above to a dry film thickness of 2 μm with a roll coater, and by drying to form a clear layer laminate formed by successively laminating a process paper sheet, a clear film layer and a hot melt adhesive layer.

The colored base film and the clear layer laminate showed good appearance with little or no defects such as foaming and the like.

The clear layer laminate was laminated onto the colored base film layer so that the surface of the colored coating layer could be brought into contact with the surface of the hot melt adhesive layer by use of a heating twin roll at 100° C. according to a laminate processing, followed by peeling the process paper sheet from the clear film layer to obtain a colored film formed by successively laminating a releasable sheet, an adhesive layer, a base film layer, a colored coating layer, a hot melt adhesive layer and a clear film layer. The metallic coating composition used for forming the colored coating layer and the clear coating composition used for forming the clear film layer are as shown in Table 3.

Next, the releasable sheet of the above colored film was removed, and the resulting colored film was subjected to vacuum forming in the same manner as in Example 1 by use of the vacuum forming apparatus shown in FIGS. 1-2.

TABLE 3

| | Examples | | | | | | |
|---|---|---|---|---|---|---|---|
| | 12 | 13 | 14 | 15 | 16 | 17 | 18 |
| Base film | A | A | A | A | A | A | B |
| Metallic coating composition | a | b | c | d | e | f | a |
| Clear coating composition | g | h | i | j | k | l | g |
| Film appearance after vacuum forming (*3) | good | good | good | good | good | good | good |

EXAMPLE 19

Preparation of colored films of the above fifth embodiment

An acrylic adhesive layer and a silicone-treated releasable sheet were successively laminated on one side of a base film having a film thickness of 250 μm and comprising polyvinyl chloride film (A), and metallic coating composition (a) was coated on the other side of the base film with a roll coater to a dry film thickness of 40 μm, followed by drying at 40° C. for 2 hours, and the Alonmelt PES was coated on the metallic coating to a dry film thickness of 2 μm with a roll coater to obtain a colored base film formed by successively laminating a releasable sheet, an adhesive layer, a base film layer, a colored coating layer and a hot melt adhesive layer.

Separately, a respective clear composition (g) was coated on a process paper sheet comprising polyethylene terephthalate with a roll coater to a dry film thickness of 80 μm, followed by drying at 80° C. for 30 minutes, and by drying to form a clear layer laminate formed by successively laminating a process paper sheet and a clear film layer.

The colored base film and the clear film layer laminate showed good appearance with little or no defects such a foaming and the like.

The clear film layer was laminated onto the colored base film layer so that the surface of the clear film layer could be brought into contact with the surface of the hot melt adhesive layer by use of a heating twin roll at 100° C. according to a laminate processing, followed by peeling the process paper sheet from the clear film layer to obtain a colored film formed by successively laminating a releasable sheet, and adhesive layer, a base film layer, a colored coating layer, a hot melt adhesive layer and a clear film layer.

Next, the releasable sheet of the above colored film was removed, and the resulting colored film was subjected to vacuum forming in the same manner as in Example 1 by use of the vacuum forming apparatus shown in FIGS. 1-2. The resulting colored film showed good appearance after vacuum forming (*3).

What is claimed is:

1. A colored film for use in vacuum forming comprising a colored film laminate formed by successively laminating a releasable sheet, an adhesive layer, a base film layer, a colored coating layer and a clear layer, said colored coating layer being formed by use of a colored coating composition containing, as essential components: (I) a resin composition comprising a mixture of a polyester polyol resin with a polyisocyanate compound, said polyester polyol resin being a resin having two or more hydroxyl groups on an average in one molecule, having the hydroxyl group on a terminal of its molecular backbone chain, substantially free of hydroxyl group on its molecular side chain, and having a weight-average molecular weight of 1000 to 30,000, said polyisocyanate compound being a modified diisocyanate compound obtained by incorporating diisocyanate for being reacted into polyester polyol in such an amount as to contain two on an average of isocyanate groups on the molecular terminal; (II) a coloring material; and (III) an organic solvent.

2. The colored film as claimed in claim 1 wherein said clear layer comprises a clear film layer separately prepared and said colored film laminate being formed by a process which comprises successively laminating the releasable sheet, the adhesive layer, the base film layer and the colored coating layer to form a colored base film layer, separately and successively laminating the clear film layer and a process paper sheet to form a clear layer laminate, followed by laminating the clear layer laminate onto the colored base film layer so that the surface of the colored coating layer can be brought into contact with the surface of the clear film layer while heating according to a laminate processing to form a colored film laminate, and by removing the process paper sheet.

3. The colored film as claimed in claim 1 wherein said colored film laminate is formed by successively laminating the releasable sheet, the adhesive layer, the base film layer, the colored coating layer, a hot melt adhesive layer and the clear layer.

4. The colored film as claimed in claim 2 wherein said clear layer comprises a clear film layer separately prepared and said colored film laminate being formed by a process which comprises successively laminating the releasable sheet, the adhesive layer, the base film layer and the colored coating layer to form a colored base film layer, separately and successively laminating the hot melt adhesive layer, the clear film layer prepared separately and a process paper sheet to form a clear layer laminate, followed by laminating the clear layer laminate onto the colored base film layer so that the surface of the colored coating layer can be brought into contact with the surface of the hot melt adhesive layer while heating according to a laminate processing to form a colored film laminate, and by removing the process paper sheet.

5. The colored film as claimed in claim 2 wherein said colored film laminate is formed by successively laminating the releasable sheet, the adhesive layer, the base film layer, the colored coating layer, the hot melt adhesive layer and the clear layer comprising a clear film layer separately prepared, said colored film laminate being formed by a process which comprises successively laminating the releasable sheet, the adhesive layer, the base film layer, the colored coating layer and a hot melt adhesive layer separately formed to form a colored base film layer, and separately and successively laminating the clear film layer and a process paper sheet form a clear layer laminate, followed by laminating the clear layer laminate onto the colored base film layer so that the surface of the hot melt adhesive layer can be brought into contact with the surface of the clear film layer while heating according to laminate processing to form a colored film laminate, and by removing the process paper sheet.

6. A colored film for use in vacuum forming comprising a colored film laminate formed by successively laminating an adhesive layer and a color coating layer formed by use of a colored coating composition containing, as essential components:

(I) a resin composition comprising at least one member selected from a group consisting of a mixture of a polyol resin having a mean molecular weight of 1000 to 30,000 and hydroxyl group on backbone chain terminals with a polyisocyanate compound as a crosslinking agent and having a mean molecular weight of 400 or more, a mixture of acrylic resin with a vinyl chloride/vinyl acetate copolymer resin, and a polyurethane resin; (II) a coloring material; and (III) an organic solvent, the colored film laminate being formed by successively laminating a releasable sheet, an adhesive layer, a base film layer, the colored coating layer, a hot melt adhesive layer and a clear layer, the clear layer comprising a clear film layer separately prepared and said colored film laminate being formed by a process which comprises successively laminating the releasable sheet, the adhesive layer, the base film layer and the colored coating layer to form a colored base film layer, separately and successively laminating the hot melt adhesive layer, the clear film layer prepared separately and a process paper sheet to form a clear layer laminate, followed by laminating the clear layer laminate onto the colored base film layer so that the surface of the colored coating layer can be brought into contact with the surface of the hot melt adhesive layer while heating according to a laminate processing to form a colored film laminate, and by removing the process paper sheet.

7. A colored film for use in vacuum forming comprising a colored film laminate formed by successively laminating an adhesive layer and a color coating layer formed by use of a colored coating composition containing, as essential components:

(I) a resin composition comprising at least one member selected from a group consisting of a mixture of a polyol resin having a mean molecular weight of 1000 to 30000 and hydroxyl group on backbone chain terminals with a polyisocyanate compound as a crosslinking agent and having a mean molecular weight of 400 or more, a mixture of acrylic resin with a vinyl chloride/vinyl acetate copolymer resin, and a polyurethane resin; (II) a coloring material; and (III) an organic solvent, the colored film laminate being formed by successively laminating a releasable sheet, an adhesive layer, a base film layer, the colored coating layer, a hot melt adhesive layer and a clear layer, comprising a clear film layer separately prepared, said colored film laminate being formed by a process which comprises successively laminating the releasable sheet, the adhesive layer, the base film layer, the colored coating layer and a hot melt adhesive layer separately formed to form a colored base film layer, and separately and successively laminating the clear film layer and a process paper sheet to form a colored base film layer, and separately and successively laminating the clear film layer and a process paper sheet to form a clear layer laminate, followed by laminating the clear layer laminate onto the colored base film layer so that the surface of the hot melt adhesive layer can be brought into contact with the surface of the clear film layer while heating according to a laminate processing to form a colored film laminate, and by removing the process paper sheet.

* * * * *